(12) United States Patent
Bigelow et al.

(10) Patent No.: US 9,902,130 B2
(45) Date of Patent: Feb. 27, 2018

(54) METHODS OF PROCESSING A GLASS SUBSTRATE AND GLASS APPARATUS

(71) Applicant: Corning Incorporated, Corning, NY (US)

(72) Inventors: Donald Orrin Bigelow, Honeoye Falls, NY (US); Kiat Chyai Kang, Painted Post, NY (US); Sue Camille Lewis, Webster, NY (US); Govindarajan Natarajan, Poughkeepsie, NY (US); Eungsik Park, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 407 days.

(21) Appl. No.: 14/412,152

(22) PCT Filed: Jun. 25, 2013

(86) PCT No.: PCT/US2013/047553
§ 371 (c)(1),
(2) Date: Dec. 30, 2014

(87) PCT Pub. No.: WO2014/008036
PCT Pub. Date: Jan. 9, 2014

(65) Prior Publication Data
US 2015/0183186 A1    Jul. 2, 2015

Related U.S. Application Data

(60) Provisional application No. 61/667,048, filed on Jul. 2, 2012.

(51) Int. Cl.
*B32B 7/06* (2006.01)
*B32B 17/06* (2006.01)
(Continued)

(52) U.S. Cl.
CPC ............. *B32B 7/06* (2013.01); *B32B 7/045* (2013.01); *B32B 17/06* (2013.01); *B32B 37/18* (2013.01);
(Continued)

(58) Field of Classification Search
CPC ... B32B 7/06; B32B 43/006; B32B 2307/748; B32B 2457/20; B32B 17/06;
(Continued)

(56) References Cited

U.S. PATENT DOCUMENTS

| 3,089,801 A | 5/1963 | Tierney et al. |
| 3,892,614 A | 7/1975 | Levy |

(Continued)

FOREIGN PATENT DOCUMENTS

| DE | 10323303.2 | 5/2003 |
| DE | 20215401 U1 | 3/2004 |

(Continued)

OTHER PUBLICATIONS

International Search Report and Written Opinion of the International Searching Authority, or the declaration—dated Sep. 30, 2013.

*Primary Examiner* — Linda L Gray
(74) *Attorney, Agent, or Firm* — Jeffrey A. Schmidt

(57) ABSTRACT

Methods of processing a glass substrate comprise the step of obtaining a glass substrate and a tab removably attached to a portion of the glass substrate. The position of the glass substrate is manipulated with the engagement portion and the tab is removed from the portion of the glass substrate by releasing a mounting portion of the tab from the portion of the glass substrate without damaging the glass substrate. In further examples, methods include the steps of removably attaching first and second tabs to respective first and second surfaces of a glass substrate and coiling the glass substrate on a storage roll wherein the first tab adheres to the second (Continued)

tab. In further examples, a glass apparatus comprises a glass substrate and a removable tab including a mounting portion attached to a portion of the glass substrate with a first peel force of less than about 10 N/cm.

7 Claims, 9 Drawing Sheets

(51) Int. Cl.
*B32B 37/18* (2006.01)
*B32B 38/10* (2006.01)
*B32B 7/04* (2006.01)
*B32B 43/00* (2006.01)
*B65G 49/06* (2006.01)

(52) U.S. Cl.
CPC ............ *B32B 38/10* (2013.01); *B32B 43/006* (2013.01); *B32B 2307/748* (2013.01); *B32B 2457/20* (2013.01); *B65G 49/069* (2013.01); *B65H 2301/51122* (2013.01); *B65H 2557/514* (2013.01); *B65H 2701/1315* (2013.01); *B65H 2801/61* (2013.01); *C03C 2218/355* (2013.01); *Y10T 156/1153* (2015.01); *Y10T 156/1158* (2015.01); *Y10T 156/1195* (2015.01); *Y10T 428/24777* (2015.01); *Y10T 428/24802* (2015.01)

(58) Field of Classification Search
CPC .......... Y10T 428/24777; B65G 49/069; B65H 2301/51122; B65H 2801/61
See application file for complete search history.

(56) References Cited

U.S. PATENT DOCUMENTS

| | | |
|---|---|---|
| 5,220,358 A | 6/1993 | Brown et al. |
| 5,514,238 A | 5/1996 | Mauduit et al. |
| 5,972,152 A | 10/1999 | Lake et al. |
| 6,689,626 B2 | 2/2004 | Krijn et al. |
| 6,815,070 B1 | 11/2004 | Bürkle et al. |
| 2008/0037141 A1 | 2/2008 | Tom et al. |
| 2009/0277983 A1 | 11/2009 | Kanzaki et al. |
| 2010/0260964 A1 | 10/2010 | Nakamura et al. |
| 2010/0276066 A1 | 11/2010 | Kondo |
| 2011/0074905 A1* | 3/2011 | Marcus ............... B41J 17/02 347/218 |
| 2011/0223386 A1 | 9/2011 | Tomamoto et al. |
| 2012/0131955 A1 | 5/2012 | Kuroiwa et al. |
| 2012/0258584 A1 | 10/2012 | Garner et al. |
| 2013/0236675 A1 | 9/2013 | Garner et al. |

FOREIGN PATENT DOCUMENTS

| | | |
|---|---|---|
| EP | 1803601 A1 | 12/2006 |
| EP | 1803601 B1 | 12/2006 |
| GB | 1319846 | 11/1970 |
| GB | 2263252 A | 7/1993 |
| JP | 2004/199643 | 7/2004 |
| JP | 2004331341 A | 11/2004 |
| JP | 2011/171595 | 9/2011 |
| WO | 8706626 A1 | 11/1987 |
| WO | 1987006626 A1 | 12/1987 |

* cited by examiner

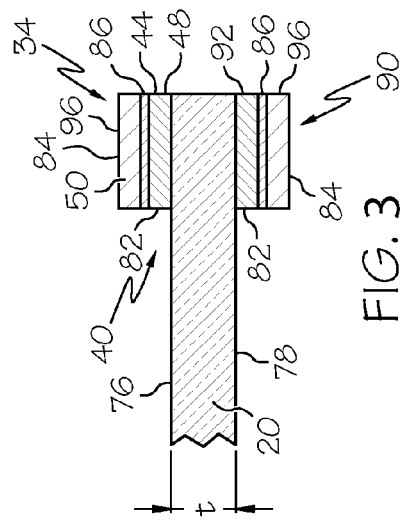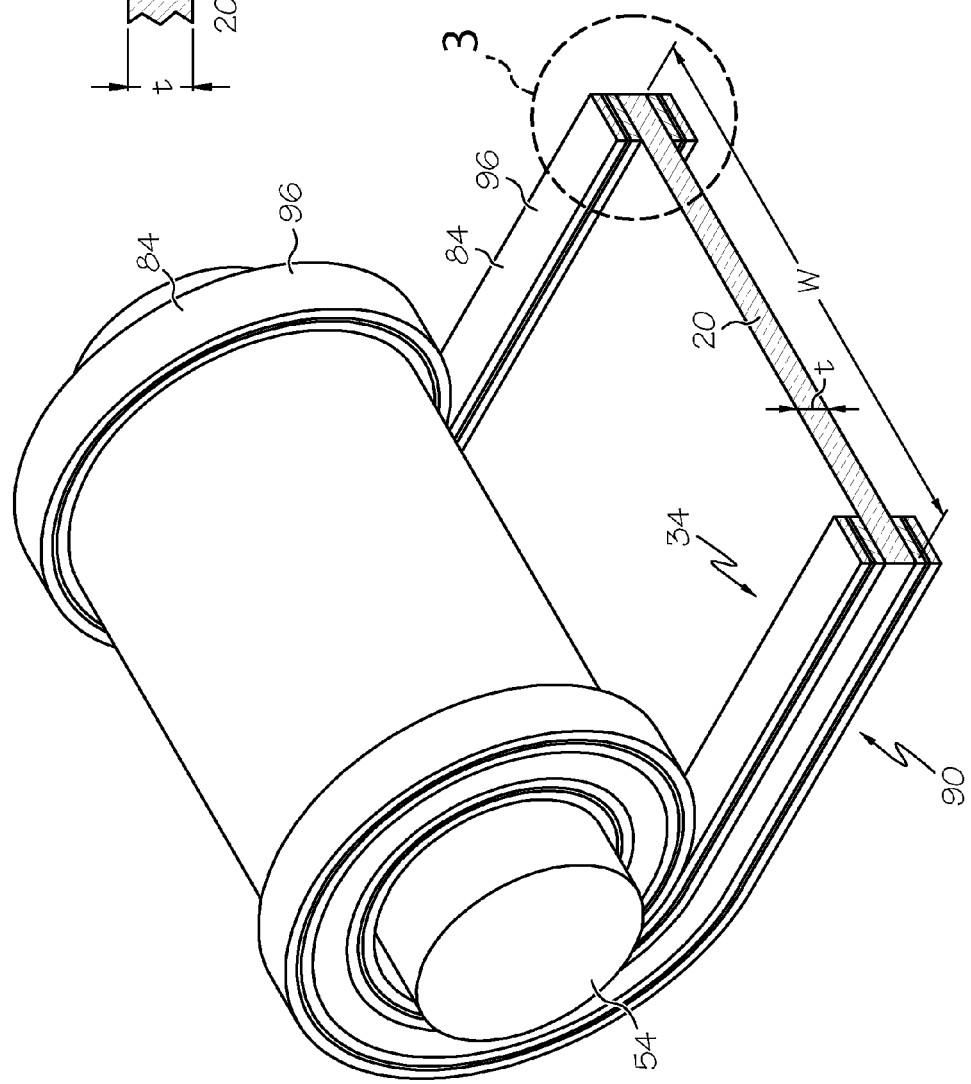

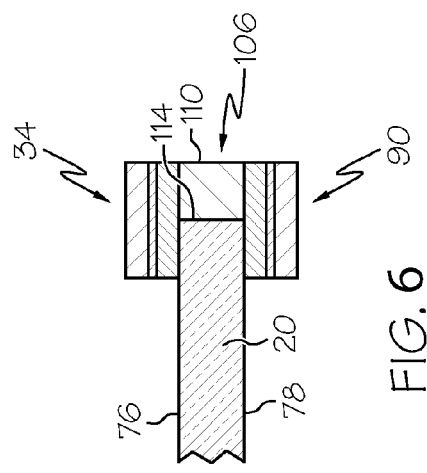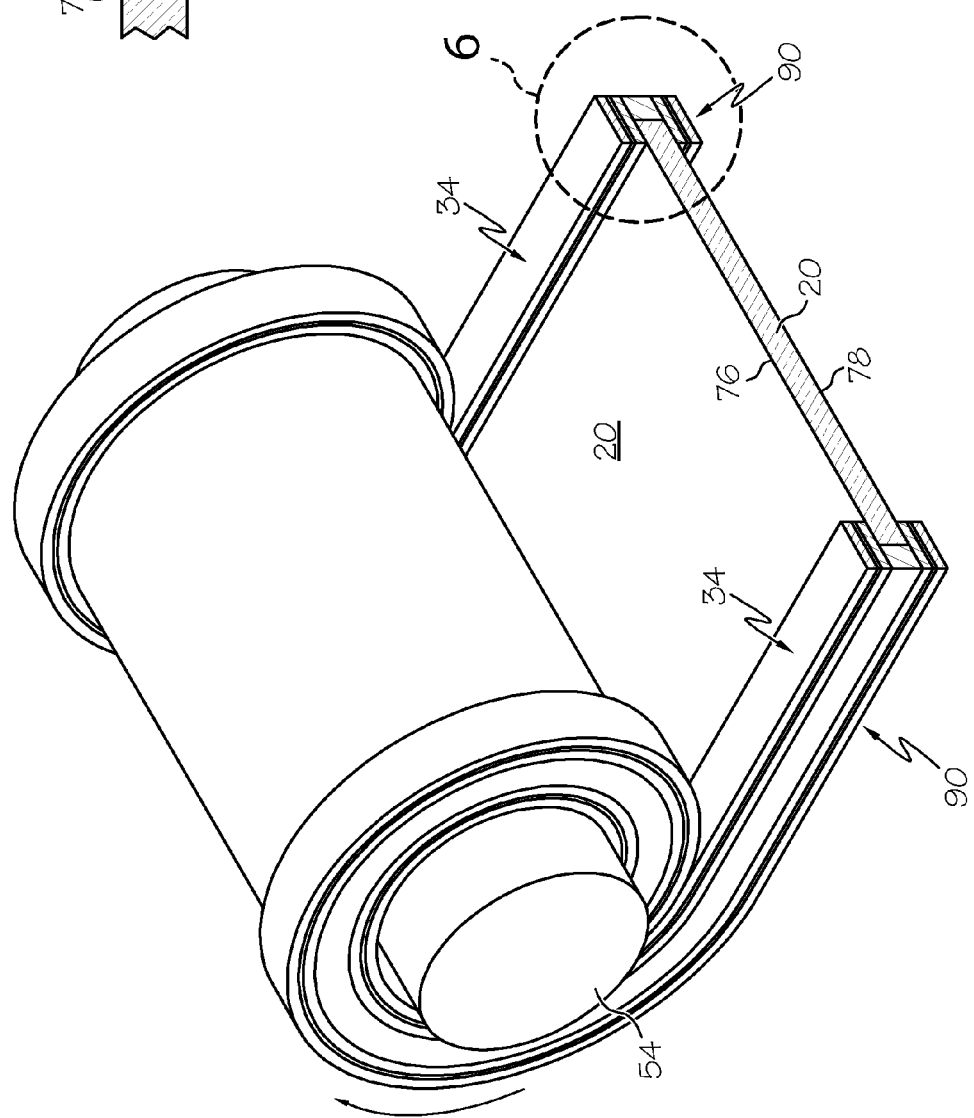

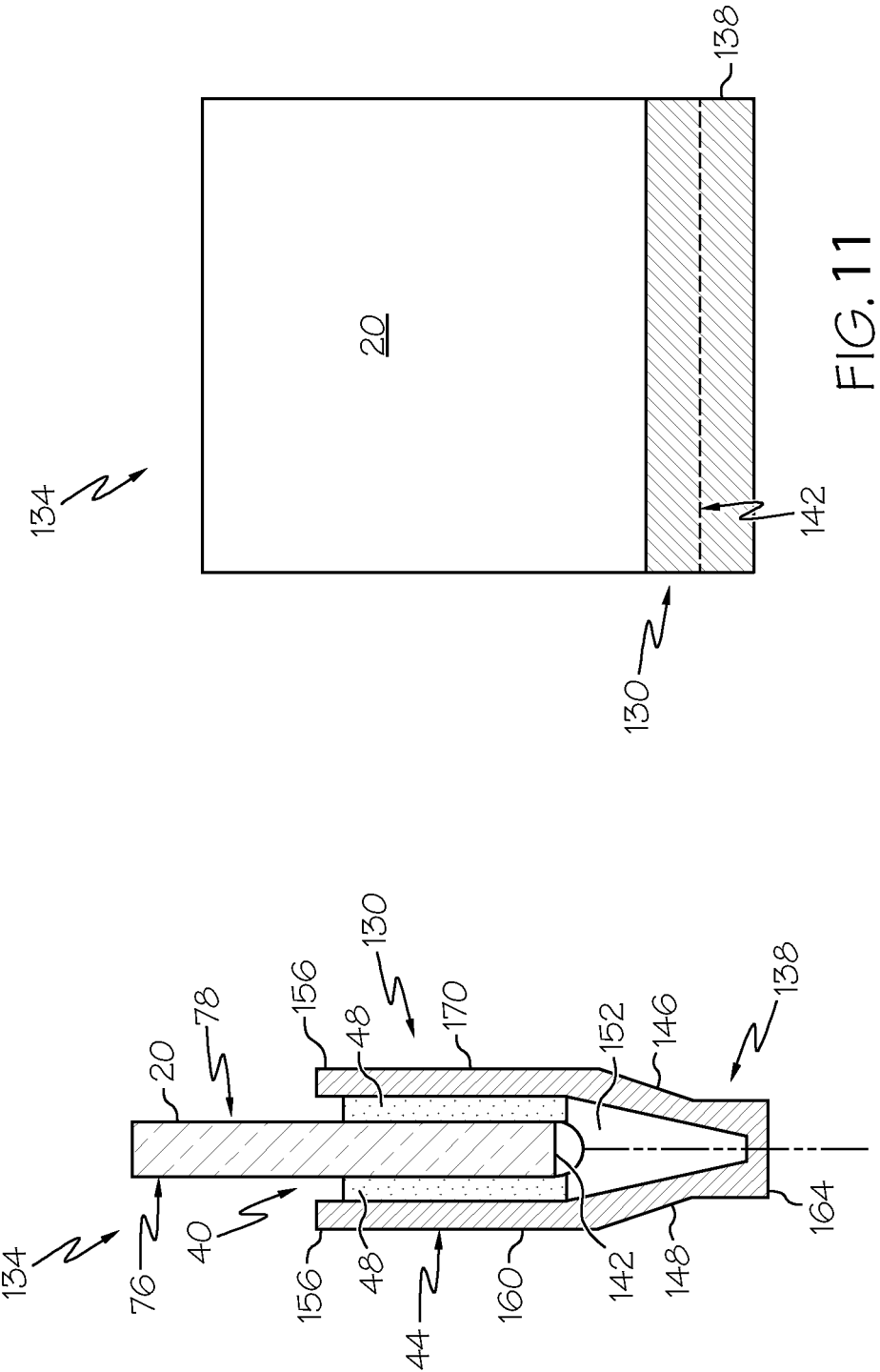

METHODS OF PROCESSING A GLASS SUBSTRATE AND GLASS APPARATUS

This application claims the benefit of priority under 35 U.S.C. § 371 of International Patent Application Ser. No. PCT/US13/47553, filed on Jun. 25, 2013 designating the United States of America, which claims the benefit of priority under 35 U.S.C. § 119 of U.S. Provisional Application Ser. No. 61/667048, filed on Jul. 02, 2012, the content of which is relied upon and incorporated herein by reference in its entirety.

The present disclosure relates generally to methods of processing a glass substrate and glass apparatus and, more particularly, to methods of processing a glass substrate including at least one tab thereon.

BACKGROUND

Glass sheets sub-divided from glass substrates are commonly used, for example, in display applications, for example liquid crystal displays (LCDs), electrophoretic displays (EPD), organic light emitting diode displays (OLEDs), plasma display panels (PDPs), or the like. Glass substrates commonly undergo manufacturing processes utilizing tabs that both protect the glass substrate from contact damage during manipulation and help manipulate the glass substrates without requiring direct contact with the glass substrate. Increasingly advanced electronic devices can include thin film devices attached directly to the glass substrates in high temperature processes. However, the utilization of tabs during the high temperature processes and in other facets of the manufacturing processes can foul the thin film devices and/or hinder other manufacturing steps. Thus, there is a need for a process and apparatus which allow: selective tab removal at determined points in the manufacturing process; tab removal without necessitating cutting of the glass substrate; and tab removal during a continuous manufacturing process.

SUMMARY

In one aspect, a method of processing a glass substrate comprises the step (I) of obtaining a glass substrate and a tab removably attached to a portion of the glass substrate such that the tab includes a mounting portion attached to the portion of the glass substrate and an engagement portion. The method further includes the step (II) of manipulating a position of the glass substrate with the engagement portion. The method further includes the step (III) of removing the tab from the portion of the glass substrate by releasing the mounting portion of the tab from the portion of the glass substrate without damaging the glass substrate.

In one example of the aspect, step (III) includes removing substantially the entire tab from the portion of the glass substrate.

In another example of the aspect, step (I) includes removably attaching the mounting portion of the tab to the portion of the glass substrate with a pressure sensitive adhesive.

In still another example of the aspect, step (III) includes heating the mounting portion of the tab.

In yet another example of the aspect, step (I) includes removably attaching the tab to the portion of the glass substrate with an electrostatic charge.

In a further example of the aspect, step (III) includes removing the tab by de-ionizing a surface of at least one of the tab and the glass substrate.

In yet a further example of the aspect, step (III) includes removing the tab by exposing an adhesive to UV light.

In still a further example of the aspect, after step (III), further including the step (IV) of processing the glass substrate within a temperature range of greater than 75° C.

In yet a further example of the aspect, after step (IV), further comprising the step (V) of applying a protective member to the glass substrate.

In another example of the aspect, after step (III), further comprising the step (IV) of applying a protective member to the glass substrate.

In yet another example of the aspect, after applying the protective member, further comprising the step (V) of winding the glass substrate on a post-process storage roll.

In another example of the aspect, step (I) obtains the glass substrate and the tab from a pre-process storage roll including a winding of the glass substrate with the tab.

In yet another example of the aspect, prior to step (III), further comprising the step of unwinding the glass substrate from the pre-process storage roll.

In yet further examples of the aspect and/or examples of the aspects, the portion of the glass substrate comprises an edge portion of the glass substrate.

In another aspect, a method of processing a glass substrate comprises the step (I) of obtaining a glass substrate including a portion with a thickness defined between a first surface and a second surface facing away from the first surface. The method further includes the step (II) of removably attaching a first area of a first tab to the first surface of the portion of the glass substrate to provide a first peel force of the first area of the first tab from the first surface of the portion of the glass substrate. The method still further includes the step (III) of removably attaching a first area of a second tab to the second surface of the portion of the glass substrate to provide a second peel force of the first area of the second tab from the second surface of the portion of the glass substrate. The method also includes the step (IV) of coiling the glass substrate on a storage roll wherein a second area of the first tab adheres to a second area of the second tab with a third peel force that is greater than the first peel force and the second peel force.

In one example of the aspect, the method further comprises the step (V) of uncoiling the glass substrate from the storage roll while simultaneously releasing the first tab from the first surface of the portion of the glass substrate and the second tab from the second surface of the portion of the glass substrate.

In another example of the aspect and/or example of the aspect, the portion of the glass substrate comprises an edge portion of the glass substrate.

In another aspect, a glass apparatus comprises a glass substrate and a removable tab including an engagement portion and a mounting portion. The mounting portion is attached to a portion of the glass substrate with a first peel force of less than about 10 N/cm.

In one example of the aspect, the engagement portion of the tab is formed from a first element and a second element that that are attached together.

In another example of the aspect, the two elements of the engagement portion are attached together with a second peel force that is greater than the first peel force.

In still another example of the aspect, the tab comprises a folded portion positioned between the first element and the second element.

In yet another example of the aspect, the mounting portion includes a first flange extending from the first element and a second flange extending from the second element.

In still another example of the aspect, the mounting portion is attached to the portion of the glass substrate by one of an adhesive and an electrostatic charge.

In yet another example of the aspect, the mounting porting portion is attached to the portion of the glass substrate by an adhesive selected from the group consisting of: a pressure-sensitive adhesive, a light-sensitive adhesive, and a temperature-sensitive adhesive.

In another example of the aspect and/or examples of the aspect, the portion of the glass substrate comprises an edge portion of the glass substrate.

The above examples of the one aspect may be used in any and all combinations with each other.

BRIEF DESCRIPTION OF THE DRAWINGS

The above and other features, aspects and advantages of the present invention are better understood when the following detailed description of the invention is read with reference to the accompanying drawings, in which:

FIG. 2 is a perspective view of an example pre-process storage roll winding a glass substrate and tabs which can be used in the glass substrate process of FIG. 1;

FIG. 3 is an enlarged view of an edge portion of the glass substrate taken from circle 3 in FIG. 2;

FIG. 5 is a perspective view of an example pre-process storage roll winding a glass substrate and tabs similar to FIG. 2, showing tabs with material next to the edge of the edge portion;

FIG. 6 is an enlarged view of an edge portion of the glass substrate taken from circle 6 in FIG. 5;

FIG. 10 is a partial sectional view of a glass apparatus including a removable tab folded about a glass substrate showing locations of two different adhesives;

FIG. 11 is a top view of the glass apparatus of FIG. 10; and

DETAILED DESCRIPTION

Figure 1:
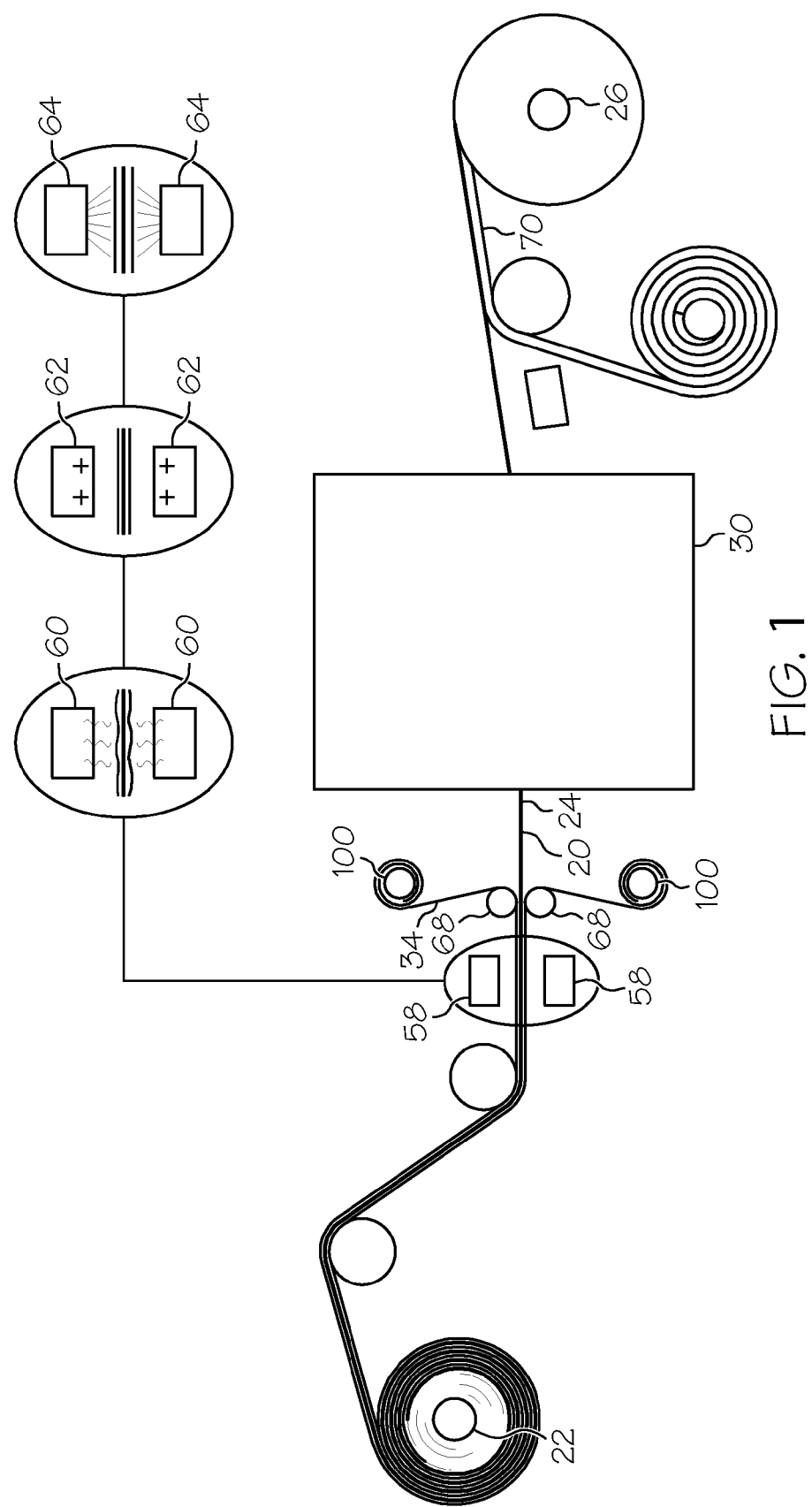
FIG. 1 is a schematized view of an example glass substrate process including a high temperature process.

The present invention will now be described more fully hereinafter with reference to the accompanying drawings in which example embodiments of the claimed invention are shown. Whenever possible, the same reference numerals are used throughout the drawings to refer to the same or like parts. However, the claimed invention may be embodied in many different forms and should not be construed as limited to the embodiments set forth herein. These example embodiments are provided so that this disclosure will be both thorough and complete, and will fully convey the scope of the claimed invention to those skilled in the art.

Directional terms as used herein (e.g., up, down, right, left, front, back, top, bottom) are made only with reference to the figures as drawn and are not intended to imply absolute orientation.

Glass ribbons are frequently provided as thin and flexible ribbons that can be wound and un-wound from rolls. However, even though glass can be made flexible, the thin flexible glass ribbons may still be prone to damage (e.g., scratching, cracking, etc.). For certain applications, particularly those for which visual defects can be distracting (e.g. display applications), even minor, seemingly cosmetic defects can be deemed unacceptable. Thus, handling of the glass ribbon in a manufacturing process, for example the depositing of thin film devices on the glass ribbon, can become a source of loss and high cost.

In one particular example, thin glass substrates are utilized in a number of applications, such as touch sensors, color-filters, thin film transistors (TFT), and photovoltaic (PV) glass applications. The glass substrate discussed herein may, for example, be a glass ribbon of indeterminate length, or a portion of a glass ribbon (e.g., a separated portion comprising a glass sheet). The glass for these applications can be very thin, typically less than 0.3 mm. This thin glass can be processed as a sheet of glass substrate or as a ribbon of glass. Processing ribbons of glass can be performed at high speed via roll-to-roll processing, where the glass is dispensed from one roll, passes through manufacturing process steps, and then spooled onto a second roll.

Although glass can be processed on an individual sheet basis, further examples include providing a thin ribbon of glass substrate wound on a roll as illustrated in FIG. 1. FIG. 1, as with the remaining figures in the drawings, are provided in schematic form wherein the features shown in the drawings are not necessarily in proportion.

As shown in FIG. 1, as glass substrate 20 is un-wound from the roll 22, the un-wound or dispensed portion 24 can be processed, and then re-wound on a second "take-up" roll 26. In this context, the term "processed" can include any step subsequent to the formation of the glass substrate 20, including but not limited to grinding, polishing, cleaning, or the deposition of additional layers and/or components (e.g. electrical/electronic components or portions thereof) on the glass. For example, the term processed can include a high temperature process 30, schematically shown as a box in FIG. 1. For example, the formation of thin film devices (e.g. transistors, electroluminescent layers, etc.) on the glass substrate 20 may require a high temperature process 30. Once the devices are formed, there is the problem of stacking or re-winding the glass substrate 20 for later use, perhaps in a subsequent manufacturing process, without damage to the glass substrate 20 or the devices formed on one or more surfaces of the glass substrate 20.

Processing glass substrates in sheet or roll form can include the use of an tab 34 (e.g., see FIG. 2) located on the glass substrate 20 to aid in various processing steps. For example, tab 34 can be placed on the glass substrate 20 to help reduce physical damage to the glass substrate 20 during handling. In another example, the tab 34 can help align layers of glass substrate 20 within rolls of glass substrate 20 so that the edges of the roll remain aligned with respect to one another as the glass substrate 20 is rolled. In yet another example, the tab 34 can be configured to permit glass substrate 20 location and manipulation without physical contact of one layer of the glass substrate 20 with an adjacent layer of the glass substrate within the roll, or with the thin film devices located on an adjacent layer of the glass substrate 20. Furthermore, the tab 34 is removable and can therefore be removed prior to the high temperature process 30; thereby avoiding degrading of the tab and/or the glass substrate 20 that may otherwise occur. As such, the tab may be easily removed prior to the high temperature process, thereby allowing high temperature procedures to be carried out without complication from the tab. After the high temperature process another tab that may be identical, similar or even different may optionally be applied to the substrate after the temperature of the substrate is reduced sufficiently to allow attachment of the tab, prevent degradation of the tab and preserve the integrity of the portions of the substrate engaged with the tab.

Methods of processing a glass substrate 20 will now be described. The method may begin by providing a glass substrate 20 including at least one edge portion 40 (e.g., see FIG. 2). Processing can be carried out for glass substrates 20 in sheet form, roll form, or other forms, however, it is to be appreciated that certain manufacturing and processing advantages can be accomplished by including a roll form of glass substrate 20 allowing a greater degree of economic advantage through a more continuous process as opposed to batch processing of individual sheets of glass substrate. In one example, the at least one edge portion 40 can be an edge area of the roll form glass substrate 20 that is generally parallel to the direction of travel of the glass substrate 20 as it is unwound from the roll.

As shown in FIG. 2, the method continues by removably attaching a tab 34 including a mounting portion 44 to the edge portion 40 of the glass substrate 20. Any number of attachment methods can be used to attach the mounting portion 44 of the tab 34 to the edge portion 40 of the glass substrate 20. For example, the mounting portion 44 can include an adhesive 48 that helps hold the tab 34 to the edge portion 40 of the glass substrate 20. In several particular examples, the adhesive 48 can be a pressure sensitive adhesive (PSA), wherein the adhesive force between the mounting portion 44 and the glass substrate 20 can be increased by choosing appropriate material. In a further example, the tab 34 can include an adhesive 48 that is sensitive to heat. In yet a further example, the tab can include an adhesive 48 that is sensitive to the application of ultraviolet (UV) light. In still a further example, attaching the tab 34 can include removably attaching the tab 34 to the edge portion 40 of the glass substrate 20 with an electrostatic charge.

In addition to the mounting portion 44, the tab 34 includes an engagement portion 50 protruding away from an edge of the edge portion 40 of the glass substrate 20. In this context, "protruding away" from the edge of the edge portion 40 of the glass substrate 20 can include the engagement portion 50 protruding up, down, left, right, or any other direction away from the edge portion 40 of the glass substrate 20. After the tab 34 is removably attached to the glass substrate 20, the method can optionally include the step of winding the glass substrate on a pre-process storage roll 54. Winding the glass substrate 20 on a pre-process storage roll 54 introduces flexibility to the processing method, as the glass substrate 20 can then be more efficiently stored for later processing as needed. In cases where the glass substrate 20 has been wound on a pre-process storage roll 54, the glass substrate 20 processing method can include unwinding the glass substrate 20 from the pre-process storage roll 54 prior to further processing steps.

The method further includes manipulating a position of the glass substrate 20 by engaging the engagement portion 50 of the tab 34. For example, processing equipment such as pinch rollers wherein upper rollers and lower rollers pinch the engagement portion 50 of the tab 34, rotate, and manipulate the position of the glass substrate 20 by conveying it to a desired position. In another example, two tractor assemblies that comprise belts can pinch the glass substrate 20 between the belts by contacting only the engagement portions 50 of the tab 34. These two examples are not limiting, and any number of other manipulating devices can be used in conjunction with the engagement portion 50 of the tab 34. In further examples, prior to unwinding, the position of the glass substrate 20 may be manipulated by moving the pre-process storage roll 54 during storage, transport, processing or the like, wherein the engagement portion 50 of the tab 34 can help space apart pristine surfaces of the flexible glass ribbon stored on the coiled storage roll.

The method additionally includes removing the tab 34 from the edge portion 40 of the glass substrate 20 by releasing the mounting portion 44 of the tab 34 from the edge portion 40. Releasing the mounting portion 44 of the tab 34 from the edge portion 40 of the glass substrate 20 is conducted without damaging the glass substrate 20.

As further shown in FIG. 1, a glass processing method can include a device 58 to aid in the removal of the tab 34. Such a device 58 is schematically shown in FIG. 1 as two boxes and can include any number of different actual mechanisms as shown. In one example, the device 58 is an edge heater 60 configured to heat the mounting portion 44 of the tab 34 and the adhesive 48 to break down the adhesion force between the glass substrate 20 and the mounting portion 44. In another example, the device 58 is a de-ionizer 62 and the step of removing the tab 34 includes de-ionizing at least one of the tab 34 and the glass substrate 20. This step of de-ionization removes an electrostatic charge that adheres the mounting portion 44 of the tab 34 to the edge portion 40 of the glass substrate 20. In a further example, the device 58 is a mechanism 64 configured to provide UV light and the step of removing the tab 34 includes exposing the adhesive 48 to UV light, thereby decreasing or eliminating the adhesion force between the mounting portion 44 and the edge portion 40 of the glass substrate 20. It is to be appreciated that each of the described examples of removing the tab 34 from the edge portion 40 of the glass substrate 20 may work with a particular adhesion method and that the device 58 can be selected to work with one particular type of tab 34 adhesion method. Furthermore, the device 58 can be interchangeable to accommodate various tab 34 adhesion methods as they are used with any particular glass substrate 20 processing method.

Any of the described examples of removing the tab 34 from the edge portion 40 of the glass substrate 20 can be combined with a physical operation to remove the tab 34. For example, a process roller 68 can direct the tab to collect and/or wind long lengths of the tab 34 from the glass substrate 20 and onto corresponding take-up reels 100 as it moves through the process. In another example, an object can be placed in physical contact with the tab 34 and/or the glass substrate 20 to aid the removal of the tab 34. It is to be appreciated that the step of removing the tab 34 from the edge portion 40 of the glass substrate 20 can include removing substantially the entire tab 34 from the edge portion 40. This includes the condition of no adhesive 48 remaining on the edge portion 40 after the removal of the tab 34 or an amount of adhesive 48 that does not significantly affect the desired performance of the glass substrate 20 in its intended use, for example an electronic device.

Glass substrate 20 processing methods can further include the step of processing the glass substrate 20 within a temperature range of greater than 75° C. In a further example, the temperature range is greater than 100° C. In a still further example, the temperature range is greater than 275° C. In further examples, the temperature range can be greater than 400° C., greater than 500° C., greater than 600° C., or even higher. That is, after removal of the tab, the processing temperature is limited only by the temperature capability of the glass substrate 20. After removal of the tab 34, the manufacturing process for the glass substrate 20 can continue through a high temperature process 30 without the constraints or engineering demands required of the high temperature process for a glass substrate 20 that includes the tab 34. As such, the high temperature process 30 can include temperatures above 75° C. (for example, above 100° C., above 275° C., above 400° C., above 500° C., or above 600° C.) without degradation of the tab 34 which can negatively affect the performance of the materials adhered to the glass substrate 20.

However, it is to be appreciated that there are benefits to removing the tab 34 in certain glass substrate processes regardless of whether there is a high temperature process 30. Examples of room temperature processes include "printing" and "decoration." For example, the glass substrate processing may require a chemical application to the glass substrate 20 that can negatively affect the tab 34. In another example, it may be beneficial for the glass substrate 20 to come into direct contact with another surface rather than the glass substrate 20 being contacted only through the tab 34. For example, this can be the case when a particular heat transfer effect is desired, and the glass substrate 20 comes into direct contact with a heat sink or a heat source. Some tabs 34 can include a step of about 75 μm that may prevent direct contact between the glass substrate 20 and another surface. Removal of the tab 34 can initiate the desired contact between the glass substrate 20 and another surface. In another example, the glass substrate process may include a step requiring a bond of the glass substrate 20 to another surface, wherein the tab 34 may interfere in the bonding process. In a further example, removal of the tab 34 can provide more useable area of the glass substrate 20. In some applications, the tab 34 can be removed from the glass substrate 20 without physically cutting the glass substrate 20, thereby avoiding wasted glass substrate 20.

Regardless of whether the high temperature process 30 is included in the glass substrate processing method, the process can further include the optional step of applying a protective member 70 to the glass substrate 20. The protective member 70 can comprise an interleaf (e.g., glassine interleaf), laminated plastic layer, foam, or other protective members. In another example, the protective member 70 can comprise one or more tabs 34 similar to the tab 34 described above. Each of the examples of the protective member 70 can be attached to the glass substrate 20 to protect the glass substrate 20 from damage and/or provide an engagement portion 50 suitable for use in further manipulating the position of the glass substrate 20.

After the protective member 70 is applied to the glass substrate 20, the glass substrate processing method can further include the step of winding the glass substrate 20 on a post-process storage roll 26. The post-process storage roll 26 can be suitable for storage in preparation for shipment, or in preparation for subsequent processing steps.

Although in connection with FIG. 1 only tab 34 is described, there may be any suitable number of such tabs 34 disposed on either side of the glass substrate 20. Further, the number of tabs 34 need not be the same on each side of the glass substrate 20. Still further, even when the number of tabs 34 on each side of the glass substrate 20 is equal, they need not be placed in the same position across the width of the glass substrate 20. In one example, a single tab strip may be provided on only one side of the substrate or a plurality of strips may be located in different positions along the first and/or second side of the substrate.

FIG. 2 describes another example method of processing a glass substrate 20 that includes providing a glass substrate 20 having at least one edge portion 40. The glass substrate 20 includes a thickness "t" defined between a first surface 76 and a second surface 78 facing away from the first surface 76. The glass substrate 20 can be very thin, for example, less than 0.3 mm for some applications. This thin glass substrate 20 can be processed as a sheet of glass substrate or as a ribbon of glass substrate.

FIG. 3 is an enlarged view of one edge portion 40 of the glass substrate 20 shown in FIG. 2 and shows a first tab 34 that includes a first area 82 and a second area 84 facing away from the first area 82 as two opposing sides. The first area 82 and the second area 84 can be joined by a core material 86 serving as a central support for both the first area 82 and the second area 84. In one example, the core material 86 can be a woven, pliable, non-damaging material. The first area 82 of the first tab 34 can be arranged to face the first surface 76 of the edge portion 40, while the second area 84 faces away from the first surface 76 of the edge portion 40.

The first area 82 is removably attached to the first surface 76 of the edge portion 40 with an adhesive 48. In one example, the adhesive 48 on the first area 82 of the first tab 34 can be considered a "low-tack" adhesive 48. In this context, the low-tack qualification can provide an adhesive force that tends to keep the tab 34 in place on the glass substrate 20 during glass substrate 20 manipulation, storage and some processing activities. Additionally, the low-tack qualification generally has a relatively lower adhesive force to the glass substrate 20 than typical known adhesives used to attach tabs to glass substrates, allowing the tab 34 to be removably attached to the glass substrate 20. The adhesive 48 provides a first peel force of the first area 82 of the first tab 34 from the first surface 76 of the edge portion 40. Various materials can be chosen for this adhesive 48 including, but not limited to, PSA, adhesives sensitive to UV light, and adhesives having a thermal release component.

The method further includes removably attaching a first area 82 of a second tab 90 to the second surface 78 of the edge portion 40. Similar to the described first tab 34 and first surface 76, the first area 82 of the second tab 90 can be arranged to face the second surface 78 of the edge portion 40, while a second area 84 of the second tab 90 faces away from the second surface 78 of the edge portion 40. In one example, the second tab 90 is located in a position on the second surface 78 of the edge portion 40 so that the first tab 34 and the second tab 90 provide a mirror image about the glass substrate 20. In further examples, a mirror image may not be provided. For example, the second tab is not a mirror image of the first tab. For example, the second tab may be oriented in nonsymmetrical configurations or a single tab may be provided. However, in order to facilitate peeling of the tabs 34 from the glass substrate 20, at least a portion of the second area of the first tab can be disposed in contacting relation with at least a portion of the second area of the second tab. Attachment of the second tab 90 to the glass substrate 20 is accomplished with an adhesive 92 to provide a second peel force of the first area 82 of the second tab 90 from the second surface 78 of the edge portion 40. Although not required, in some examples, the second peel force can be equal to or nearly equal to the first peel force of the first area 82 of the first tab 34 from the first surface 76 of the edge portion 40. In one example, the adhesive 48 included on the first area 82 of the first tab 34 is the same adhesive 92 included on the first area 82 of the second tab 90. Various materials can be chosen for this adhesive 92 including, but not limited to, PSA, adhesives sensitive to UV light, and adhesives having a thermal release component. As shown in FIG. 2, the first tab 34 and the second tab 90 can be removably attached to the glass substrate 20 at more than one edge portion 40. For example, as shown, the tabs can be provided at both opposed edge portions wherein a width "W" of the glass ribbon is defined between the opposed edge portions.

The method can further include the optional step of coiling the glass substrate 20 on a pre-process storage roll 54 or a post process storage roll suitable for storage or subsequent customer processing. As the glass substrate 20 is coiled, the second area 84 of the first tab 34 contacts the second area 84 of the second tab 90. Each of the second area 84 of the first tab 34 and the second area 84 of the second tab 90 may include an adhesive 96. The adhesive 96 is selected to have a cohesive force that is greater than the adhesive force applied between the tabs 34, 90 to the glass substrate 20. Thus, the second area 84 of the first tab 34 adheres to the second area 84 of the second tab 90 with a third peel force that is greater than the first peel force and the second peel force. The adhesive 96 included on the second area 84 of the first tab 34 and the second area 84 of the second tab 90 can include, but is not limited to products including rubber, silicones, and acrylics.

Figure 4:
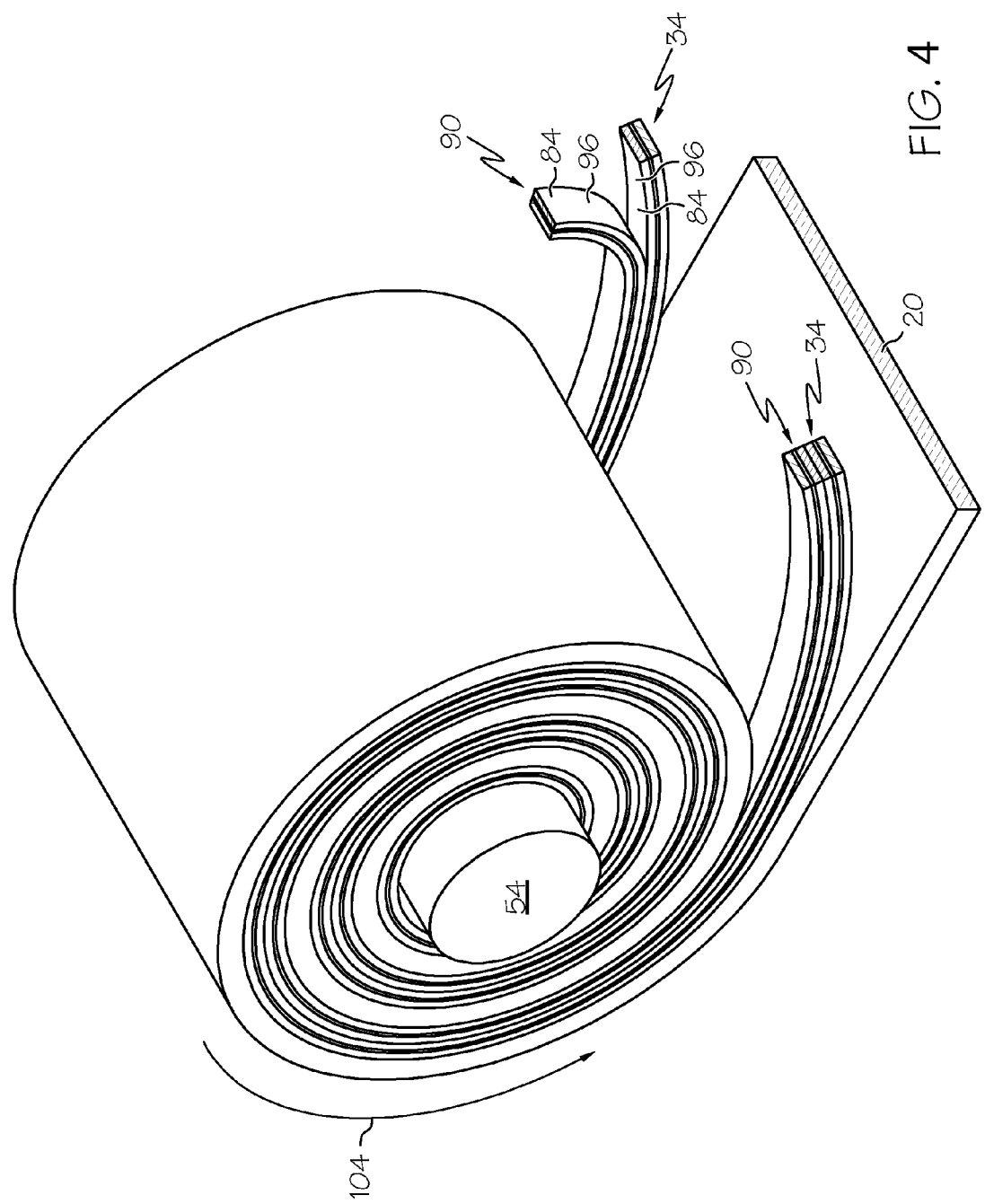
FIG. 4 is a perspective view of an example pre-process storage roll unwinding a glass substrate and tabs which can be used in the glass substrate process of FIG. 1, demonstrating the automatic removal of the tabs.

As the third peel force is greater than the first peel force and the second peel force, the first tab 34 and the second tab 90 tends to remain adhered to each other as the glass substrate 20 is uncoiled from the pre-process or post-process storage roll. This adherence between the first tab 34 and the second tab 90 helps remove the tabs 34, 90 from the glass substrate 20 prior to subsequent processing. In one example, the method can include uncoiling the glass substrate 20 from the pre-process storage roll 54 while simultaneously releasing the first tab 34 from the first surface 76 of the edge portion 40 and the second tab 90 from the second surface 78 of the edge portion 40. This simultaneous release can be aided by additional processing equipment such as a take-up reel 100 (best seen in FIG. 1) for one or both of the first tab 34 and the second tab 90. FIG. 4 shows the simultaneous release of the first tab 34 and the second tab 90 as the glass substrate 20 is uncoiled from the pre-process storage roll 54 as indicated by arrow 104.

Although the first, second, and third, peel forces have been described above as being achieved by adhesives, these peel forces may be achieved by other suitable manners, for example, by electrostatic forces, light-sensitive adhesives, or by temperature-sensitive adhesives.

FIG. 5 shows an arrangement of a first tab 34 and a second tab 90 extending over the ends of the first surface 76 and the second surface 78 of the glass substrate 20. FIG. 6 is an enlarged view of FIG. 5 showing the space 106 partially bounded by the first tab 34, the second tab 90, and the glass substrate 20 contains material 110 to fill the partially bounded space 106. In one example, the bounded space 106 can comprise a crease formed by folding. The material 110 can be an adhesive, for example a low-tack adhesive. In another example, the material 110 can be a material similar to the woven core of the first tab 34 and the second tab 90. In another example, the material 110 can be attached to one or both of the first tab 34 and the second tab 90. Location of the material 110 on the side edge 114 of the glass substrate 20 helps eliminate potential damage to the side edge 114 of the glass substrate 20 during manipulation and storage operations.

Figure 7:
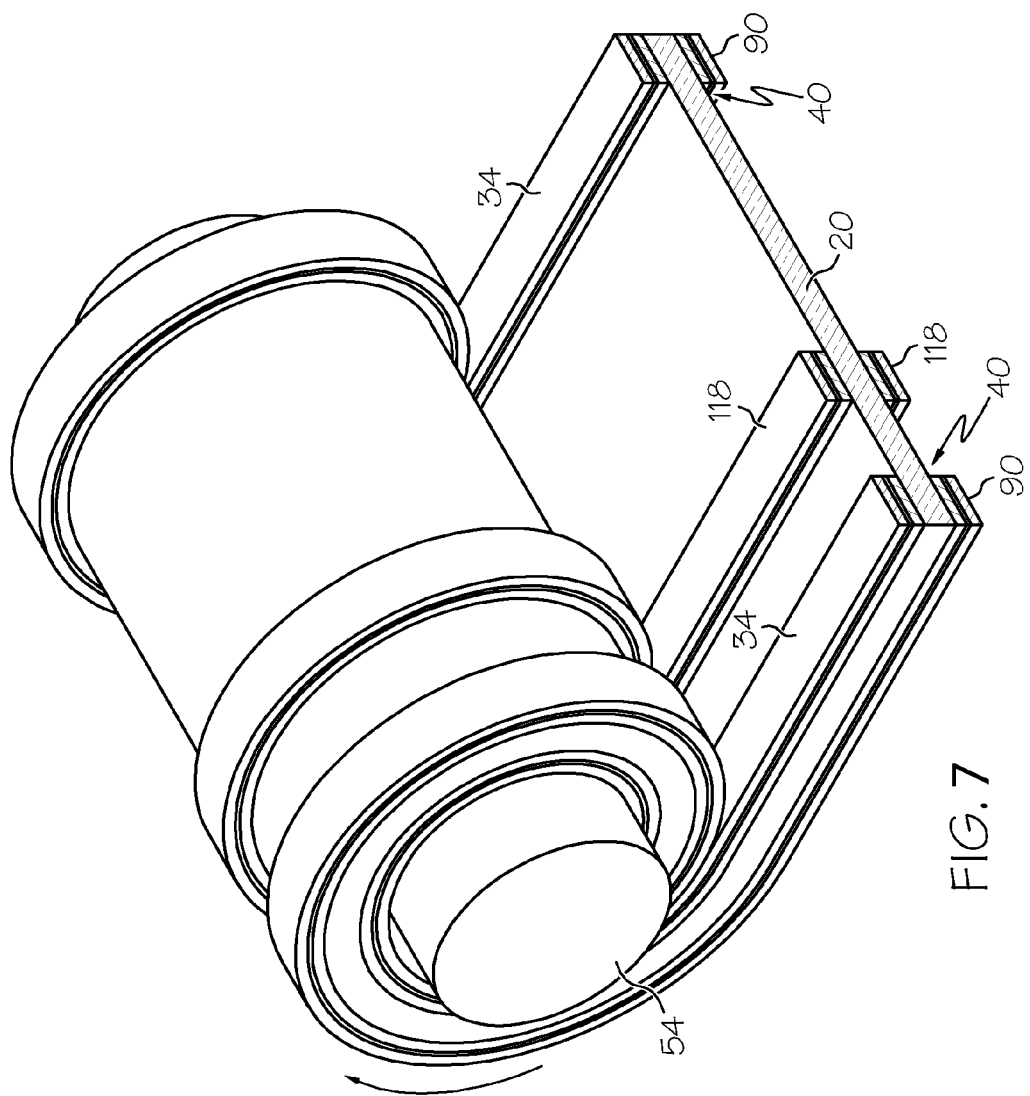
FIG. 7 is a perspective view of an example pre-process storage roll winding a glass substrate and tabs similar to FIG. 2, showing additional tabs.

Turning to FIG. 7, another arrangement of tabs 34, 90 is described. In this arrangement, at least one additional tab 118 can be removably attached to the glass substrate 20. Any additional tabs 118 can be located at any suitable location on the surface of the glass substrate 20, for example, in a location closer to one edge portion 40 of the glass substrate 20 than the other edge portion 40 of the glass substrate 20. In another example, any additional tabs 118 can be equidistant from the edge portions 40 of the glass substrate 20. Alternatively, any additional tabs 118 may be used without tabs disposed on the edge portions 40 of the glass substrate 20.

Figure 8:
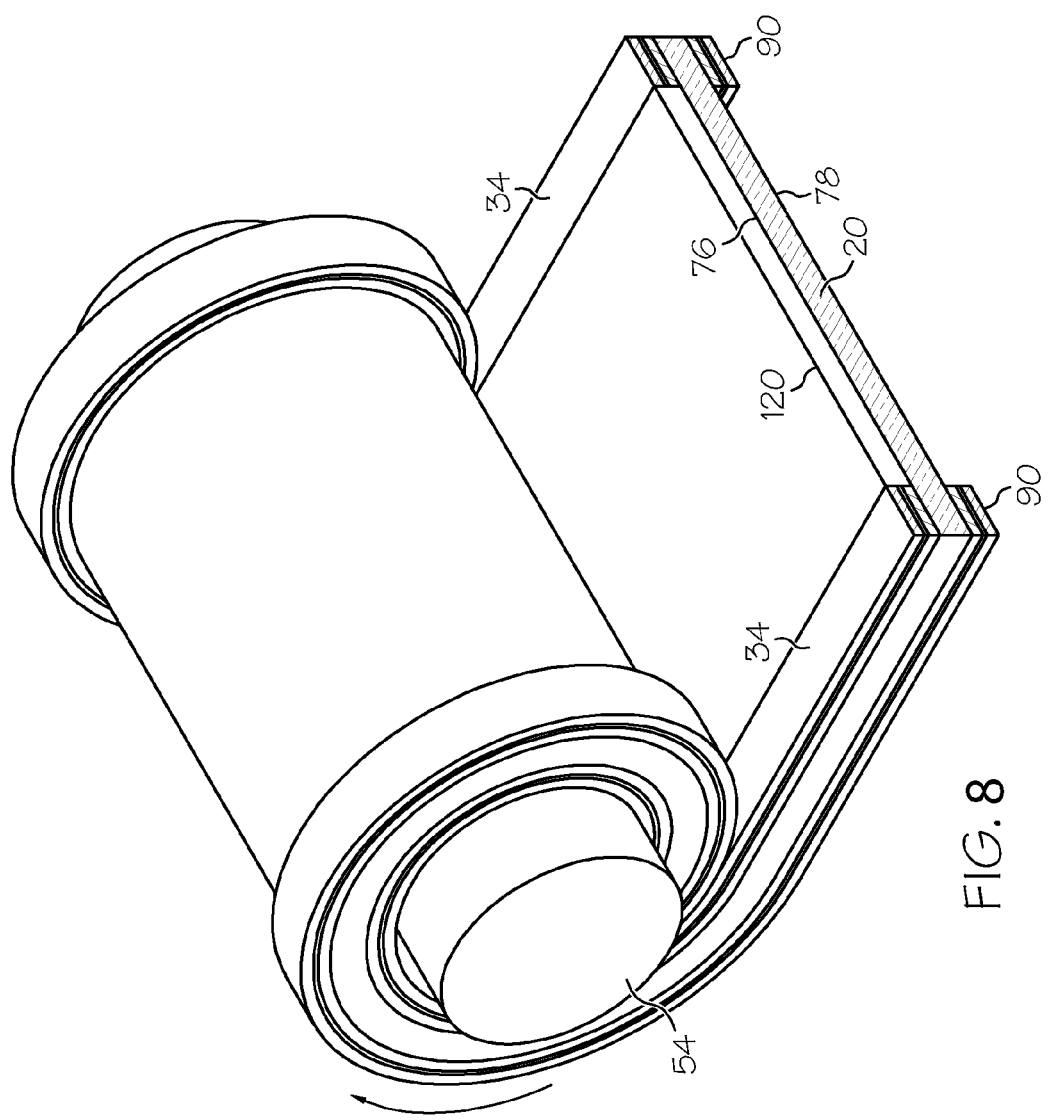
FIG. 8 is a perspective view of an example pre-process storage roll winding a glass substrate and tabs similar to FIG. 2, showing a film connection between two tabs on the first surface of the glass substrate.
Figure 9:
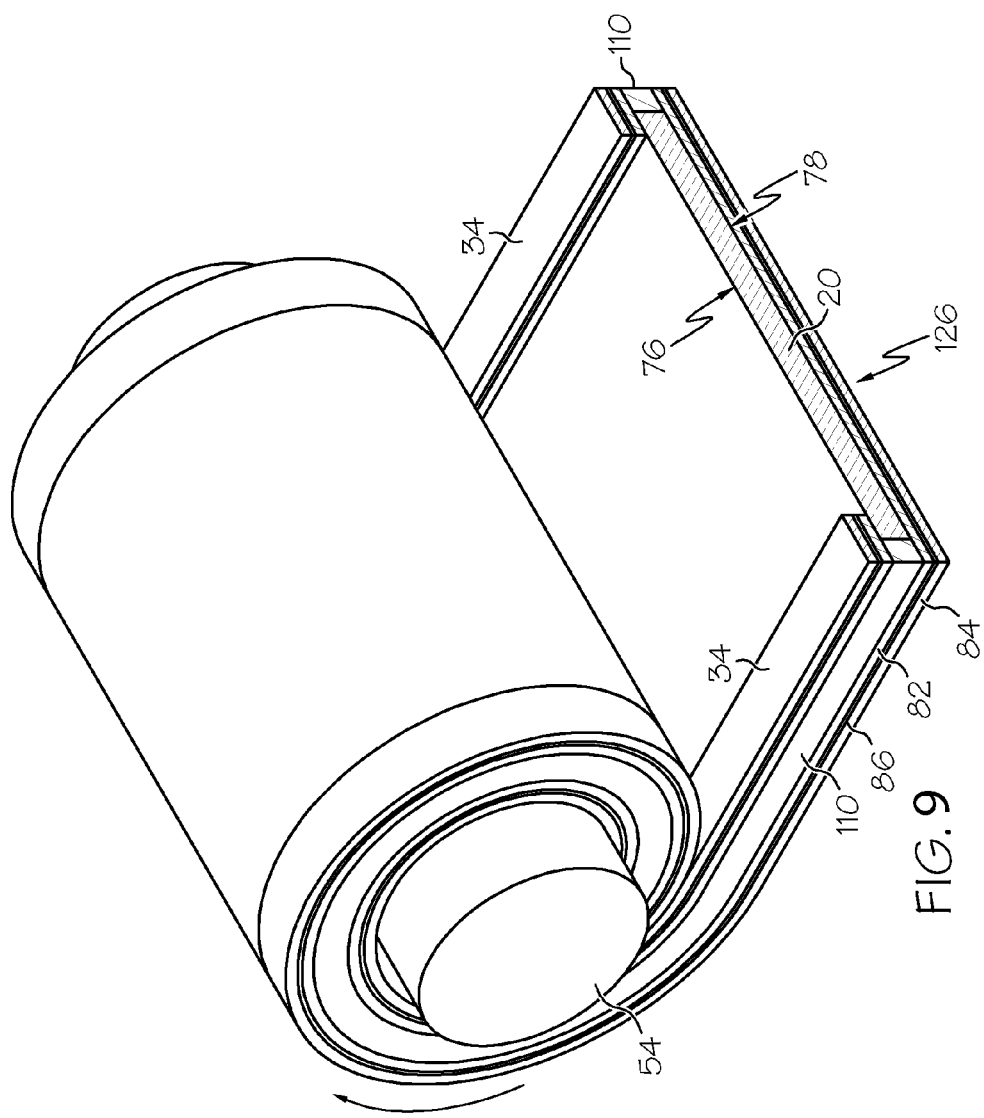
FIG. 9 is a perspective view of an example pre-process storage roll winding a glass substrate and tabs similar to FIG. 2, showing an tab spanning the width of the second surface of the glass substrate and further including material next to the edge of the edge portion.

Turning to FIG. 8, the first tab 34 at one edge portion 40 of the glass substrate 20 can be joined to the first tab 34 at the other edge portion 40 of the glass substrate 20 by a thin film 120. In one example, the thin film 120 connection can create a singular first tab that protects the entire first surface 76 of the glass substrate 20. FIG. 9 describes a second tab 126 removably attached to the glass substrate 20 covering a greater area than just one edge portion 40 of the glass substrate 20. In one example, the second tab 126 including the first area 82, the second area 84, and the core material 86 can cover the entire width of the second surface 78 of the glass substrate 20. Broad coverage of the surfaces of the glass substrate 20 can promote better protection of the glass substrate 20 from physical damage during manipulation or storage processes. Another example includes coverage of the entire width of the second surface 78 of the glass substrate 20 in addition to material 110 located between the first tab 34 and the second tab 126.

FIG. 10 describes a removable tab 130 for use with a glass apparatus 134. As with the glass products previously described, the glass apparatus 134 includes a glass substrate 20, and the glass substrate 20 includes at least one edge portion 40. The removable tab 130 is configured to help protect the glass substrate 20 from damage during manipulation or storage of the glass substrate 20 and/or allow the glass substrate 20 to be manipulated without directly contacting the glass substrate 20. The glass apparatus 134 may be a glass ribbon of indeterminate length or a portion of a glass ribbon (e.g., a separate glass sheet). As shown in FIG. 11, the removable tab 130 includes an engagement portion 138 protruding away from an edge 142 of the edge portion 40 of the glass substrate 20. Various devices such as rollers or tractor feeds can contact this engagement portion 138 of the removable tab 130 in order to transmit force to the glass substrate 20 in order to manipulate the glass substrate 20. In one example, manipulation of the glass substrate 20 includes moving the glass substrate 20 to a desired location.

As further shown in FIG. 10, the removable tab 130 includes a mounting portion 44 attached to the edge portion 40. The mounting portion 44 can be removably attached to the edge portion 40 with an adhesive 48. In one example, the adhesive 48 on the mounting portion 44 of the removable tab 130 is a low-tack adhesive 48. The low-tack adhesive 48 provides a first peel force of the mounting portion 44 from the edge portion 40 of less than about 10 Newtons/cm, such as less than about 7.5 Newtons/cm. Various materials can be chosen for this adhesive 48 including, but not limited to, PSA, adhesives sensitive to UV light, and adhesives having a thermal release component.

The engagement portion 138 of the removable tab 130 can be formed from a first element 146 and a second element 148 that that are attached together. In one example, the first element 146 and the second element 148 can be attached together with an adhesive 152 that is different than adhesive 48 provided on the mounting portion 44. In a further example, the cohesive force of the adhesive 152 holding the first and second elements 146, 148 of the engagement portion 138 together can be greater than the adhesive force applied to the mounting portion 44 of the removable tab 130. Thus, the two elements of the engagement portion 138 are attached together with a second peel force that is greater than the first peel force provided by the low-tack adhesive 48. This difference in peel forces eases the removal of the removable tab 130 at a desired process step while tending to keep the entire removable tab 130 in one piece. Furthermore, the lower first peel force of the mounting portion 44 encourages complete removal of the removable tab 130 with little or no adhesive 152 remaining on the glass substrate 20. As noted above, the different peel forces may be achieved by light-sensitive adhesives, temperature-sensitive adhesives, or electrostatic forces.

Figure 12:
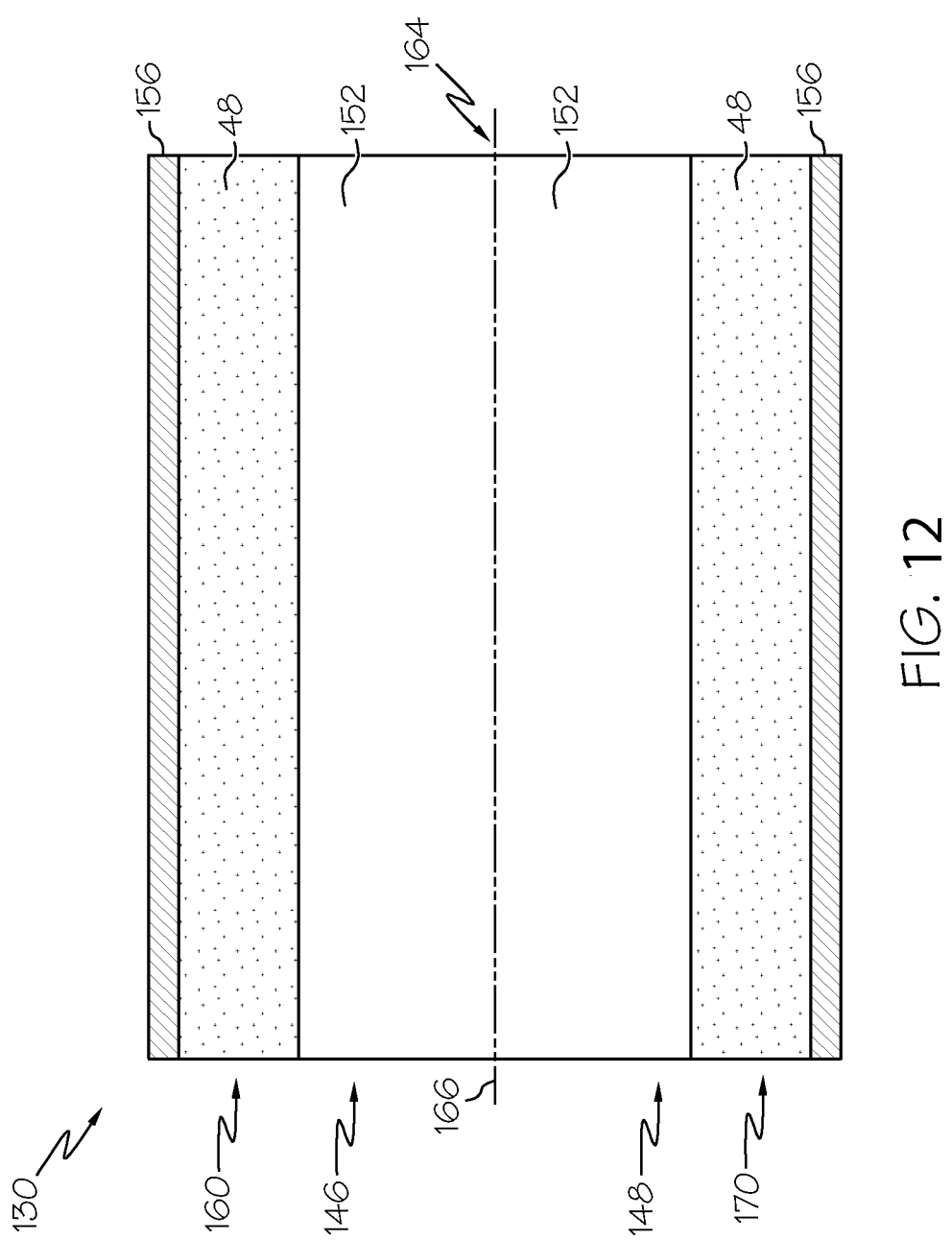
FIG. 12 is a view of the removable tab of FIG. 10 in a non-folded position showing locations of components of the removable tab.

FIG. 12 shows an example removable tab 130 in an open position prior to application to the glass substrate 20. In the figure, the first element 146 extends upward from an optional folded portion 164 and the second element 148 extends downward from the optional folded portion 164. As shown, the folded portion 164 is collinear with a centerline 166 of the removable tab 130. In a further example, the folded portion 164 can include perforation to ease the folding operation. Other examples can include a folded portion 164 at a non-central location. Moreover, in still further examples, the folded portion may not exist. Rather, the removable tab 130 may be severed along the centerline or other portion of the tab 130 or otherwise provided as two pieces that may be subsequently joined together.

As further shown, the removable tab 130 can further include first and second flanges 160, 170 respectively extending from the first and second elements 146, 148. A surface of each of the first and second flanges can be provided with the adhesive 48. The outer ends of one or both of the first and second flanges 160, 170 can include corresponding optional areas 156 at the outer extent of the removable tab 130 that contains no adhesive. The optional areas 156 may provide a convenient location that allow gripping to facilitate removal of the tab 130 at an appropriate time.

A process of applying the removable tab 130 will now be discussed. In one example, referring to FIG. 8, the first flange 160 can be attached to the first surface 76 of the glass substrate 20 by way of the mounting portion adhesive 48. As shown, once the first flange 160 is mounted in position, the remainder of the removable tab 130 extends outward from the edge 142 of the glass substrate 20. The removable tab 130 is then folded over the glass substrate 20 at the folded portion 164 so that engagement portion adhesive 152 of the first element 146 contacts the engagement portion adhesive 152 of the second element 148 to form a relatively stiff engagement portion 138. In one example, the engagement portion adhesive 152 does not contact the glass substrate 20 or the mounting portion adhesive 48. Then, the second flange 170 can be attached to the second surface 78 of the substrate 20 by way of the mounting portion adhesive 48. Thus, the removable tab 130 creates a stiff tab having a relatively stiff engagement portion 138 for greater handling efficiency. The stiff edge helps in the process steps of manipulation of the glass substrate and also helps align the edge portion 40 of the glass substrate 20 to process parameters.

The removably attached tabs discussed herein helps provide a secure reference to the glass substrate 20 position within processing equipment. Furthermore, the mounting portion adhesive 48 also has a relatively lower peel force from the glass substrate 20, leaving a substantially clean surface without damaging the glass substrate. As such, the removable tabs can facilitate easy and damage-resistant removal of the tabs to allow further processing techniques (e.g., high temperature process 30) to be carried out without the tabs.

While the various example figures illustrate tabs at both edge portions defining the width "W" of the glass ribbon, various example of the disclosure may only provide an tab with respect to a single edge portion of the glass ribbon and/or along a single edge portion of a glass substrate. Still further, tabs may be provided at any position across the width of the glass ribbon, and may be located at positions away from the edge portions of the ribbon without also having tabs at the edge portions. In just one example, although not required the tab can comprise an edge tab attached to an edge portion although further tab configurations may be provided, such as an intermediate tab attached to an intermediate portion between the edge portions or other locations. Moreover, while the illustrated examples show tabs attached to both the first surface 76 and the second surface 78 of the glass substrate, the removable tabs herein may be attached to a single surface 76, 78 of one or both of the edge portions of the glass ribbon and/or a single surface of one or more edge portions of a glass substrate.

While the various processes discussed above include a storage roll (e.g., see 54 in various figures), in further examples, the storage roll may be provided without a core. In such examples, an inner winding of the glass ribbon may act as the core with the remaining portions of the ribbon being wound around the core.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A glass apparatus comprising:
   a glass substrate comprising a thickness defined between a first surface and a second surface facing away from the first surface; and
   a removable tab including a mounting portion, wherein the mounting portion is attached to a portion of the first surface and a portion of the second surface at a first edge portion of the glass substrate with a first peel force less than about 10 N/cm and an engagement portion extending beyond a first edge of the first edge portion of the glass substrate,
   wherein the engagement portion does not contact any portion of the glass substrate, and the mounting portion does not contact a central portion of the first surface of the glass substrate or a central portion of the second surface of the glass substrate.

2. The glass apparatus of claim 1, wherein the mounting portion is attached to the glass substrate by one of an adhesive and an electrostatic charge.

3. The glass apparatus of claim 1, wherein the engagement portion comprises a first element and a second element that are attached together with a second peel force that is greater than the first peel force.

4. The glass apparatus of claim 1, wherein the engagement portion comprises a first element and a second element that are attached together with a folded portion of the engagement portion.

5. A glass apparatus comprising:
a glass substrate comprising a thickness defined between a first surface and a second surface facing away from the first surface; and
a removable tab including a mounting portion, wherein the mounting portion is attached to a first edge portion of the glass substrate with a first peel force less than about 10 N/cm and an engagement portion extending beyond a first edge of the first edge portion of the glass substrate, the engagement portion comprising a first element and a second element that are attached together with a folded portion of the engagement portion,
wherein the engagement portion does not contact any portion of the glass substrate, and the mounting portion does not contact a central portion of the first surface of the glass substrate or a central portion of the second surface of the glass substrate.

6. The glass apparatus of claim 5, wherein the mounting portion is attached to the glass substrate by one of an adhesive and an electrostatic charge.

7. The glass apparatus of claim 5, wherein the first element and the second element of the engagement portion are attached together with a second peel force that is greater than the first peel force.

* * * * *

UNITED STATES PATENT AND TRADEMARK OFFICE
CERTIFICATE OF CORRECTION

PATENT NO. : 9,902,130 B2
APPLICATION NO. : 14/412152
DATED : February 27, 2018
INVENTOR(S) : Donald Orrin Bigelow et al.

Page 1 of 1

It is certified that error appears in the above-identified patent and that said Letters Patent is hereby corrected as shown below:

On the Title Page

In Column 1, item (72), Inventors, Line 6, delete "Horseheads, NY" and insert -- Yorba Linda, CA --, therefor.

Signed and Sealed this
Fourteenth Day of April, 2020

Andrei Iancu
*Director of the United States Patent and Trademark Office*